Dec. 17, 1940.  R. H. POTTS ET AL  2,224,984
FATTY ACID DISTILLATION
Filed Aug. 19, 1936
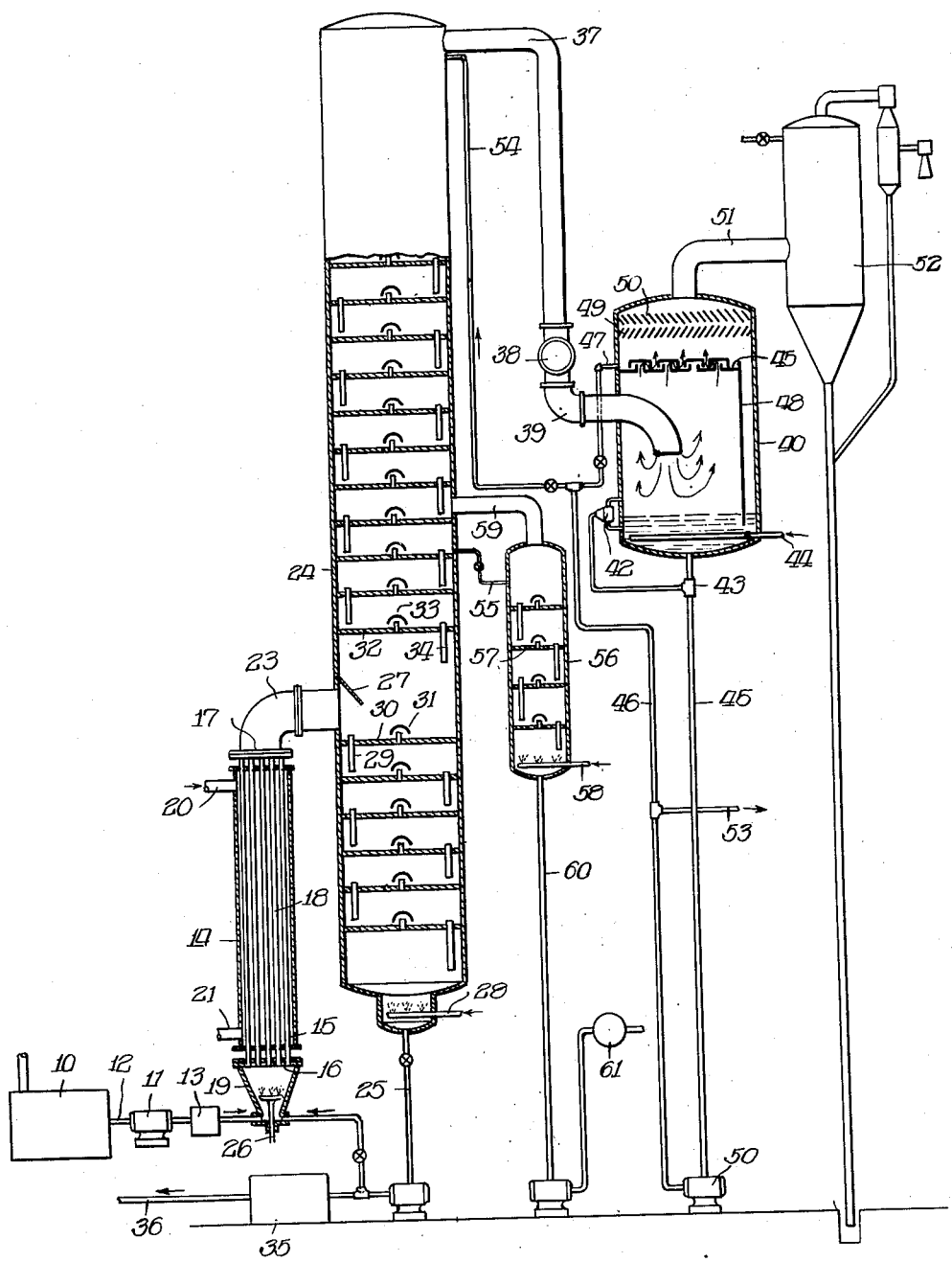
Inventors:
Ralph H. Potts,
John E. McKee,
By Cromwell, Greist & Warden
Attys.

Patented Dec. 17, 1940

2,224,984

UNITED STATES PATENT OFFICE 2,224,984

FATTY ACID DISTILLATION

Ralph H. Potts, Chicago, and John E. McKee, Western Springs, Ill., assignors to Armour and Company, Chicago, Ill., a corporation of Illinois Application August 19, 1936, Serial No. 96,732

29 Claims. (Cl. 202—52)

The present invention relates to the treatment of fatty acids and has particular reference to an improved process involving the distillation and fractionation of the fatty acids from a mixture of fatty acids having different boiling points and neutral oil, the process involving certain of the principles described in our copending application Serial No. 667,568, filed April 24, 1933, now Patent No. 2,054,096 of which the present application is a continuation in part.

In the vegetable and animal oil industry many occasions arise for the purification of oils and for the production of fatty acids or mixtures of the same in which the fatty acids are subjected to a distillation process. Animal and vegetable oils, such as cottonseed oil, corn oil, and cocoanut oil, customarily are subjected to a process of alkali refining, whereby free fatty acids in the oil are neutralized. The resulting soap flocks to the bottom of the refining kettle, together with some neutral oil that is held by the soap particles. The material thus separated from the oil is known as "foots," and ordinarily will contain on the order of 50 per cent fatty acids, the remander being impurities and water. Of the fatty acid content of the "foots," approximately 60 per cent may be free fatty acids and the remainder glycerides. These foots represent a type of material which may be treated in accordance with the invention. Other oleaginous materials containing fatty acids also may be treated, but for the sake of brevity the invention will be described as particularly applied to this type of material.

A principal object of the present invention is to provide a process for the distillation of fatty acids in an improved manner which is effective from the standpoint of the distillation operation and which results in a product of high purity, the distillation process being of a type well adapted to combined distillation and fractionation of the fatty acids.

A further object is to provide a process for distilling fatty acids in which the fatty acids are passed through a series of heat exchange tubes which are maintained under vacuum, the outside of the tubes being subjected to a condensing vapor having a boiling point above the vaporization point of the fatty acids under the conditions involved in the process and which will condense on the tubes to impart to the tubes latent heat of liquefaction.

Still another object is the provision of a process for distilling mixed fatty acids in an improved manner and separating the distilled fatty acids into fractions having different boiling points.

A further object is the provision of an improved apparatus and process for fractionating fatty acids.

These and other objects will be evident upon a consideration of the following description and by reference to the accompanying drawing in which the single figure represents, somewhat diagrammatically, suitable apparatus in which the improved process may be carried out.

In the treatment of foots of the type described, the foots are acidulated with sulfuric acid in order to break the mass into oil and water. That is, the acid breaks the soap into fatty acid and the sulfate salt of the positive radical combined with the fatty acid. The mass then separates into an oil layer and a water layer, these layers being separately recovered by any suitable process. The fatty material obtained by acidulation of the foots is usually termed "raw fatty acid stock" or "black acid foots." The distillation of fatty acids from this type of material involves several problems which depend to a considerable extent upon the tendency of the fatty acids or fatty acid containing material to be decomposed at the temperatures around the boiling point of the acids. This thermal decomposition results in a viscous residue of little value and a distillate of poor color and odor.

In the device shown in the drawing the stock, having a fatty acid content of the order of 70 per cent, is fed into the feed tank 10 from which the material is transferred by a pump 11 through line 12 and a preheater 13 to the bottom of a still indicated generally at 14. The preheater 13 may be any type of a heat exchange apparatus for conserving heat and raises the temperature of the fatty acid and neutral oil mixture to the order of 350° F.

The still 14 consists of a vertical column 15 of substantial cross section and terminated by a bottom header 16 and a top header 17. A relatively large number of pipes or tubes 18 extend between the headers 16 and 17 and provide openings through which the fatty acid materials being pumped into the conical mixing chamber 19 may be passed.

Communicating with the top of the column 15 is a vapor inlet 20 into which passes a mixture of diphenyl and diphenyl oxide vapors heated to a temperature of about 600° F. These vapors pass downwardly through column 15 and about the tubes 18. The fatty acids rising in the tubes 18 cool the tubes to a temperature below the liquefaction temperature of the vapors in the column 15 and the latter condense into a liquid upon the tubes, thereby imparting to the tubes their latent heat of liquefaction. The liquefied diphenyl and diphenyl oxide trickle down into the bottom of the tower and are withdrawn through line 21 to a suitable heater, not shown, for revaporizing the materials.

This type of distillation unit is of particular value for fatty acids since the highest temperature to which the acids are subjected is the temperature of the gases as they enter the inlet opening 20. This avoids the high local temperatures to which such materials are subjected when distilled in a pipe-still having tubes disposed directly to fire. Additionally, an effective heat exchange is attained by utilizing the heat of liquefaction of the gases. This heat exchange is so effective that the fatty acids are vaporized very rapidly and the time required for passage of the material through the distillation tubes 18 is quite short. This time preferably is no more than a few seconds and may be less than one second.

In addition to the effective method of heat transfer, the tubes 18 connect with the pipe 23 leading to the fractionating column 24, the latter being maintained under a high vacuum which extends to the tubes 18 and facilitates the vaporization therein. The high vacuum maintained in the tubes 18 provide for rapid distillation at a considerably lower temperature than in processes in which pressure is employed in the heating unit.

The fresh feed stock entering into the mixing chamber 19 is at a temperature of about 300° to 350° F. In addition to this fatty acid containing material a substantial quantity of neutral oil is recycled from the fractionating column 24 as will be described more particularly hereinafter, this material being transferred through line 25 from the bottom of the column 24 to the mixing chamber 19. The recycled stock is taken from the bottom of the column 24 at a temperature of about 500° F. and enters the mixing chamber 19 at about the same temperature. Superheated steam at a temperature of about 500° F. is passed into the mixing chamber 19 by the injector 26. This steam creates an initial velocity at the base of the tubes 18 of about 4 to 6 feet per second, the absolute pressure in the blending cone 19 being about 200 to 250 mm. For proper distillation of fatty acids we have found that the amount of steam employed in this connection should be between substantially 0.05 and 0.25 pound of steam per pound of fresh feed stock, the particular amount depending upon the type of stock being distilled. As the material passes upwardly through the heater the static pressure diminishes, and the fatty acids are vaporized. These factors combined with the expansion of the steam produce a velocity in the mass at the outlet of the tubes 18 which may be of the order of 150 to 175 feet per second. The temperature of the combined vapor and undistilled neutral oil is of the order of 550° F.

As the vapor pipe 23 is of greater cross sectional area than the combined cross sectional areas of the tubes 18, the velocity of the material slows down immediately upon issuing into this vapor pipe. From the vapor pipe 23 the mixture of fatty acid vapors and neutral oil passes into an intermediate portion of the fractionating column 24 beneath a baffle plate 27. As the cross sectional area of the fractionating column is considerably greater than the cross sectional area of the vapor pipe 23, the velocity of the vapors again considerably diminishes.

The vaporous portions of the heating material pass upwardly through the column 24 and the undistilled residue consisting mainly of neutral oil passes downwardly in the tower against a countercurrent of steam injected into the bottom of the column through line 28. The neutral oil passes through pipes 29 of the bubble plates 30 and the steam passes upwardly through the bubble caps 31. Additional quantities of unvaporized fatty acids are stripped from the neutral oil in this manner and the oil collects in the bottom of the column to be withdrawn as desired. The temperature of the steam entering the bottom of the column preferably is of the order of 500° F. so that the bottom of the column is maintained at at least as low a temperature as the temperature of material entering through pipe 23. The steam lowers the vapor pressure within the column and facilitates the stripping of the neutral oil and fractionation of the fatty acids in the bubble trays 32 positioned above the vapor inlet. The mixed vapors and steam pass upwardly through the bubble caps 33 and the liquid from these trays passes downward through the overflow lines 34. For proper fractionation the total amount of steam mixed with the fatty acid vapors preferably is maintained below substantially 0.5 pound per pound of feed stock, including the steam employed in the distillation and the steam used in the column and for stripping purposes.

The unvaporized residue from the bottom of the fractionating column 24 is divided into two streams, one of which passes into the mixing chamber 19 of the still and the other which passes into a tank 35.

The unvaporized residue in tank 35 is accumulated until the desired amount is obtained. Thereafter this residue is subjected to a splitting operation to produce a mixture containing fatty acids in an amount which may be of the order of 80 to 90 per cent, the remainder including pitch and unsaponifiable matter. The hydrolyzed mixture then is withdrawn through line 36 and subjected to a distillation operation preferably in a separate still. The fatty acids obtained from this distillation may be treated as described herein and the residue is disposed of as pitch. If distilled in the same still as the original feed stock, the mixture is distilled preferably separate from substantial quantities of fresh feed stock in order that the undistilled residue of the latter will not be contaminated.

By first distilling the free fatty acid from the raw stock by the method described herein and then splitting the neutral oil in the residue by the Twitchell process or other treatment, a higher percentage of recovery of fatty acids and glycerine is obtained. After splitting the residue, it is possible to recover the glycerine from the mixture, the fatty acids again being distilled. The recovered glycerine will be found to be of a good commercial grade. When treated in this manner, the splitting of material in tank 35 conserves the reagents, since the fatty acids have been removed from the treated material. That is, where the raw material, which may contain on the order of 60 per cent free fatty acids, is subjected to a further splitting in accordance with Twitchell's process, the entire amount of the oil is treated by boiling for 18 hours in admixture with about 2 per cent reagent, 1 per cent sulfuric acid, and 40 per cent of water by weight of the whole batch of oil, including the 60 per cent free fatty acids. A second boil generally is made with substantially 0.5 per cent acid and 10 per cent additional water. The total split from this operation may be about 94 per cent. The glycerine water resulting from the operation is of about 2 per cent or 3 per cent concentration. By first distilling the free fatty acids and then subjecting the material to the splitting operation, a glycerine content of about 8 per cent concentration is obtained. Additionally, by resplitting the material in accordance with the process described herein, there is an increase in yield of fatty acids of between 4 per cent and 8 per cent.

In addition to this advantage obtained by resplitting the second stream of the neutral oil, the repeated circulation of the first stream of neutral oil through the still and increase in temperature of the recirculated material from 500° F. to 550° F. provide heat for fractionation of the vapors in the column 24. The neutral oil may be recirculated as rapidly as desired to produce a heat balance which will take care of the reflux pumped back to the tower as will be described hereinafter.

In our copending application we have described the method whereby a mixture of fatty acids of the type described may be separated into volatile fractions having different boiling points. Where the stock distilled has been obtained from cotton-seed oil, the composition of the distilled free fatty acids may be approximately 50 per cent linoleic acid, 25 per cent oleic acid, and 25 per cent palmitic acid. The oleic and the linoleic acids are unsaturated acids which are liquid at ordinary temperatures. Oleic acid congeals at about 4° C. and linoleic acid at about −16° C. Palmitic acid, on the other hand, is a saturated solid acid having a melting point of 62° C.

The mixture is substantially completely distilled in the still 14 and enters the fractionating column in the form of a mixture of vapor and neutral oil. As the vapors arise through the tower they are met with a downwardly flowing stream of a reflux liquid which preferably initially is composed of a condensate of a lighter fraction of fatty acid taken from adjacent the top of the fractionating column. This condensate flows downwardly across the bubble plates and in traveling upward through the fractionating column the higher boiling constituents of the fatty acid vapors are condensed by the reflux and the material on each succeeding higher plate is of a lower boiling point. The fractionating column reaches the state of equilibrium in which the composition of the material on each plate remains substantially constant and the boiling point of the material on each higher plate is lower than the liquid on the next lower plate. The vapors pass upwardly through a series of pools of liquid containing the different constituents of the vapors in varying amounts, and having progressively lower boiling points.

The liquid on the lower plates of the fractionating column will contain greater quantities of oleic acid and if it is desired to obtain a fractional change in this acid, the material from the plates will be withdrawn, as desired.

From the upper bubble plate of the fractionating column the vapors, consisting principally of steam and palmitic acid, pass through line 37 into a condenser 38 which reduces the temperature of the vaporized material to about 150° F., thereby liquefying the fatty acids. As the entire system is maintained under a high vacuum the steam does not liquefy at this temperature. This steam contains a considerable portion of the liquefied fatty acids in a finely divided entrained form which makes separation difficult. The steam is passed from the condenser 38 through line 39 to a mist-extracting tank 40. The vapor line 39 extends downwardly in the tank 40 and terminates at an intermediate point therein so that the steam initially passes downwardly and then changes its direction to pass upwardly, somewhat as shown by the arrows in the drawing. The diameter of the tank 40 is greatly larger than the diameter of the line 39, so that the velocity of the vapors in the tank 40 is greatly less than the velocity of the steam in the line 39. This reduction in the vapor velocity and change of direction of the vapors results in separation of a substantial portion of the entrained matter.

There is maintained in the bottom of the tank 40 a body of the separated fatty acids as indicated in the drawing. A liquid level control mechanism 42 regulates the draw-off valve 43 of the tank 40 in such a manner as to maintain a constant level in the body of liquid which is considerably below the bottom of the line 39. The temperature of this liquid may be maintained at 150° F. by the closed steam coil 44. After initially passing downwardly in the separator 40 the steam passes upwardly through a bubble plate indicated at 45 upon which is pumped a portion of the liquid from the bottom of tank 40, this liquid being transferred through draw-off line 45, pump 50 and lines 46 and 47. A suitable weir plate 48 is provided in the tank 40 for overflow from the bubble plate 45, this plate being sealed in the usual manner. Steam vapors passing up through the bubble plate contact the liquid therein and this liquid acts to remove further quantities of the entrained fatty acids from the steam. Two sets of baffle plates 49 and 50 may be positioned above the bubble plate to provide a still further reduction in the quantity of entrained matter contained in the steam.

From the tank 40 the steam passes through line 51 to a vacuum apparatus indicated at 52 which may include a barometric condenser connected to suitable vacuum pumps, not shown.

The desired quantity of the relatively low boiling fatty acids may be passed from the tank 40 through lines 45 and 53 to a suitable source of disposal.

A further quantity of the liquefied low boiling fatty acids from the tank 40 is passed through lines 45, 46 and 54 into the top of the column as reflux liquid. Where the mixture of fatty acids is fractionated into two components, it is desirable to return as reflux a greater quantity of the lower boiling fatty acids than the quantity being removed from the process as distillate. That is, where 600 to 800 pounds of fatty acids are removed as product per hour, the reflux should be of the order of 3000 pounds per hour. As before stated, the heat required for handling this reflux and providing for fractionation in the column may be supplied at least in part by the neutral oil recirculated from the bottom of the column through the still.

The second fraction may be taken from the column at any desirable point depending upon the type of product required. For example, somewhere in the fractionating column may be found a plate which will contain unsaturated acids in the greatest degree of concentration. The liquid may be withdrawn from this plate through line 55 and passed into a stripper 56 which contains a series of bubble plates 57. Steam is introduced into the bottom of the stripper 56 through line 58. The palmitic or saturated acid removed by this steam may be returned to the column through line 59. The unvaporized unsaturated acids settle in the bottom of the stripper 56 and are withdrawn through line 60 and condensed in a cooler 61. Thereafter the material is transferred to a suitable source of disposal. This liquid is fairly pure mixture of oleic and linoleic acids and will be found to contain only a small amount of saturated acid, a more complete separation, if desired, being dependent upon further treatment.

In the fractionation of fatty acids, the column must be operated within rather narrow vacuum limits. The pressure at the top of the fractionating tower is between 5 and 35 mm. and the pressure at the vapor inlet of the column is held between 30 and 65 mm. There appears to be a definite relation between this pressure, the amount of steam which may be employed, and the effectiveness of the fractionation. If the absolute pressure is above this range, poor fractionation will be obtained and the amount of steam necessary to maintain the temperature below the thermal decomposition point of the fatty acids will be excessive, thereby causing difficulties in the operation and excessive entrainment.

By operation in the manner described it is possible to produce an overhead product which consists of approximately 10 per cent liquid unsaturated fatty acid and about 90 per cent palmitic acid. Likewise the bottom product may have a content of but 5 to 10 per cent palmitic acid, the remainder being a mixture of oleic and linoleic acids. For some uses it is desirable to produce even purer products and where this is the case the process may be operated to produce the required product.

Where it is not necessary to provide a product in which the palmitic acid content is as described, a very small overhead product varying from 5 to 10 per cent may be removed and the major portion of 60 to 70 per cent may be removed from the stripper as a deodorized and light-colored fatty acid of great purity. The reflux necessary in this method of operation is about 1000 pounds per hour where approximately 2800 pounds per hour of fatty acids are distilled, and the temperatures are reduced from 10° to 20° at the vapor inlet of the fractionating column and at the top of the tower. The reduction in temperature at the vapor inlet is due to less pressure drop across the trays, the drop being approximately 15 mm. as compared with a pressure drop of 30 to 45 mm. in the operation as described hereinbefore. In the latter method of operation any disagreeable odor or color-imparting constituents are concentrated in the low boiling fraction and this fraction will be of considerably less purity than the fraction taken from the lower portion of the tower. For example, the principal product may be taken from a stripper communicating with the tower at about twelve plates from the top of the tower.

The fatty acid vapors in the still and fractionating column are particularly deleterious upon metals with which the vapors may come in contact. Stainless steel containing about 18 per cent chromium and 8 per cent nickel with a low carbon content is attacked by the fatty acids to such an extent as to make the material somewhat unsuitable for producing the parts of the fractionation column and still which are most exposed to the fatty acid vapors. In this connection, the bubble caps are most susceptible to deterioration under the influence of the fatty acid vapors. We have found that a small percentage of molybdenum alloyed with the stainless steel produces a material which may be used for extended periods of time without replacement. In a preferred embodiment of the alloy the molybdenum is employed in quantities of about 3 per cent. Apparently, the resistance of the molybdenum steel alloy to the fatty acids is due to an affinity on the part of the molybdenum for oxygen which resists the removal of a thin film of oxide from the metal, thereby preventing attack of the metal by the acid. Thus, the molybdenum appears to form a balance with the reducing effect of the unsaturated fatty acids.

It will be recognized that many changes may be made in the process and structure described herein without departing from the scope of the invention as defined in the appended claims.

We claim:

1. The process for distilling fatty acids, which comprises subjecting the fatty acids in an enclosed stream to heat while the acids are in a state of motion, passing steam with said enclosed stream of fatty acids during the heating step, the heat and steam being sufficient in extent and quantity to form a vaporous mixture of steam and fatty acid, flashing the enclosed stream of fatty acids and steam into an expansion zone subjecting said mixture of vapors to a condensation process for liquefying the fatty acids contained in said mixture without liquefying said steam and passing the products of condensation into a separating chamber in which the liquefied fatty acids settle out and the steam is subjected to a separating operation for removing entrainment prior to liquefaction of the steam.

2. The process for distilling fatty acids, which comprises passing said fatty acids in a plurality of relatively small enclosed streams through a heat exchange zone which is subjected to vapors of an organic material having a boiling point above the boiling point of the fatty acids under the conditions of the process, maintaining the streams of fatty acid under substantial vacuum, and controlling the pressure of said vapors to effect condensation thereof in said zone.

3. The process for distilling fatty acids, which comprises passing a mixture of steam and fatty acids in a plurality of relatively small streams in an upward path of travel through a heat exchange zone which is subjected to vapors of a material having a boiling point above the boiling point of the fatty acids under the conditions of the process to effect condensation of said vapors in said zone and to heat said fatty acids to a temperature sufficiently high to cause vaporization thereof at reduced pressure, maintaining the streams of fatty acid under substantial vacuum, passing the fatty acids into an expansion and vaporization zone, and separating the vaporized fatty acids into different volatile fractions.

4. The process for distilling fatty acids, which comprises passing a mixture of steam and fatty acids in a plurality of relatively small enclosed streams through a heat exchange zone which is subjected to vapors of a material having a boiling point above the boiling point of the fatty acids under the conditions of the process, maintaining the streams of fatty acid under substantial vacuum, the amount of steam added to said fatty acids being between 0.05 and 0.25 pound per pound of fatty acid material, and subjecting the mixture of steam and fatty acids to a fractionating procedure for separating the fatty acids into different volatile fractions.

5. A process of the type described, which comprises passing a mixture of steam, fatty acids, and oil in a plurality of relatively small streams through a heat exchange zone subjected to a condensing vapor having a boiling point above the boiling point of the fatty acid under the conditions of the process, maintaining said mixture under substantial vacuum to produce a mixture of fatty acid vapors, steam and undistilled oil, subjecting said vapors to a fractional distillation procedure for separation of the fatty acids into volatile fractions having different boiling points, said procedure including the steps of passing the heated vapors through zones of condensed fatty acid mixture having successively lower boiling points, withdrawing neutral oil from below said zones, returning reflux liquid to said zones, heating at least a portion of the withdrawn oil and recycling the heated oil through said heat exchange zone to provide heat for the reflux in said fractionating procedure.

6. A process of the type described, which comprises subjecting a mixture of fatty acids having different boiling points and neutral oil to a heating process to vaporize said fatty acids, subjecting said fatty acids to a fractionation procedure including the steps of passing the heated fatty acid vapors through zones of condensed fatty acid mixture having successively lower boiling points, condensing certain of said vapors, returning a portion of the condensed vapors to said zones as reflux liquid, withdrawing unvaporized oil from below said zones, reheating said oil and returning the reheated oil to the fractionating procedure for supplying at least a portion of the heat necessary for vaporization of said reflux.

7. The process for treating fatty acid stock containing fatty acids and oil, which comprises passing the stock in a relatively small stream through a heat exchange zone subjected to a temperature sufficiently high to distill the fatty acid portion of said stock, separating the vaporized fatty acids from the oil, subjecting the oil to a hydrolyzation procedure for producing further quantities of fatty acids, separating the glycerine content of the hydrolyzed stock, and subjecting the fatty acid portions of the hydrolyzed stock to a further distillation step.

8. The process for treating acidulated foots containing fatty acids and glycerides, which comprises passing the stock in admixture with steam in a plurality of relatively small streams through a heat exchange zone subjected to a condensing vapor having a boiling point above the vaporization point of the fatty acids under the conditions of the process, maintaining said mixture under vacuum to produce a vaporous mixture containing volatilized fatty acids and steam and unvaporized oil, separating the volatilized fatty acids into fractions, subjecting the oil to hydrolyzation, and redistilling the hydrolyzed oil.

9. The process of treating fatty acid stock containing a mixture of fatty acids of different boiling points, which comprises vaporizing and subjecting the fatty acids to a fractionation procedure in which the fatty acids are passed upwardly through zones of condensed fatty acid mixture having successively lower boiling points, and maintaining said vapors under an absolute pressure of between 5 and 35 mm. at the upper portion of said zones and at an absolute pressure of between 30 and 65 mm. at the vapor inlet portion of said zones.

10. The process of treating fatty acid stock containing a mixture of volatile fatty acids of different boiling points, which comprises subjecting the fatty acid materials to a distillation procedure in which the fatty acids are heated to vaporization temperature in the presence of steam, subjecting the mixture of fatty acids and steam to a fractionation procedure in which said mixture is passed upwardly in zones of condensed fatty acid mixture having successively lower boiling points, passing additional steam upwardly through said zones, and maintaining said vapors under an absolute pressure of between 5 and 35 mm. at the upper portion of said zones and between 30 and 65 mm. at the vapor inlet of said zones.

11. The process of treating fatty acid stock containing a mixture of volatile fatty acids of different boiling points, which comprises subjecting the fatty acid materials to a distillation procedure in which the fatty acids are heated in the presence of steam, subjecting the mixture of fatty acids and steam to a fractionation procedure in which said mixture is passed upwardly through zones of condensed fatty acid mixture having successively low boiling points, and passing additional steam upwardly through said zones.

12. The process for treating fatty acid stock containing relatively low boiling impurities and volatile fatty acids of different boiling points, which comprises subjecting said stock to a distillation operation in which said fatty acids and impurities are volatilized, subjecting the resulting vapors to a fractionation process in which said vapors are passed upwardly through zones of condensed fatty acid mixtures having successively lower boiling points, withdrawing substantial quantities of liquid fatty acids substantially free from said impurities from a zone having a relatively high boiling point, withdrawing fatty acid vapors and volatilized impurities from the upper portion of said zones, condensing said vapors and returning substantial quantities thereof to the upper portion of said zones as reflux.

13. The process for distilling fatty acids, which comprises passing said fatty acids through heat exchange tubes which are subject to a heating medium having a temperature higher than the vaporization temperatures of said fatty acids under the conditions of the process, passing steam through said tubes with said acids, and then introducing the mixture of fatty acids and steam into an expansion and distillation zone.

14. The process for distilling fatty acids, which comprises passing said fatty acids through heat exchange tubes subject to a heating medium having a temperature sufficiently high to raise the temperature of said acids to at least substantially 550° F., passing steam through said tubes with said acids, and then introducing the acids and steam into an expansion and distillation zone.

15. The process for distillation of fatty acids, which comprises passing a stream of said fatty acids through a heated tube subjected to a heating medium having a temperature sufficiently high to raise the temperature of said fatty acids at least as high as their vaporization point under the conditions of the process, passing steam through said tube with said acids, the amount of said steam being between 0.05 and 0.25 pound per pound of fatty acid material, and introducing said fatty acids and steam into an expansion and vaporization zone.

16. The process for distillation of fatty acids, which comprises subjecting the fatty acids to a preheating step, passing a stream of said fatty acids through a tube subjected to a heating medium having a temperature sufficiently high to raise the temperature of said fatty acids at least as high as the vaporization point of some of the constituents thereof under the conditions of the process, passing steam through said tube with the acids, the amount of said steam being between 0.05 and 0.25 pound per pound of fatty acid material, maintaining the contents of the tube under substantially reduced pressure, and introducing said fatty acids and steam into an expansion zone.

17. The process for distillation of fatty acids, which comprises subjecting said acids to a preheating step, passing said fatty acids through a heating tube subject to vapors of a mixture of diphenyl and diphenyl oxide having an initial temperature sufficiently low to cause said vapors to condense on said tube, passing steam under pressure through said tube with said fatty acids, the amount of said steam being between 0.05 and 0.25 pound per pound of fatty acid material, and introducing said acids and steam into an expansion and vaporization zone maintained under substantially reduced pressure.

18. The process of treating oleaginous material containing a mixture of volatile fatty acids having different boiling points and of saturated and unsaturated composition, which comprises passing said material and steam in a relatively small stream through a heating zone, passing the heated material into an expansion and vaporization zone to volatilize said fatty acids, passing the volatilized fatty acids upwardly through heat exchange zones of condensed fatty acids having successively lower boiling points, condensing the saturated fatty acid vapors passing through the last of said zones, returning at least a portion of the condensed saturated fatty acids to the last of said zones as reflux, and withdrawing from a lower zone a liquid fraction containing at least 90 per cent unsaturated acids.

19. The process of treating oleaginous material containing triglycerides and a mixture of volatile fatty acids having different boiling points and of saturated and unsaturated composition, which comprises subjecting said material to a continuous heating operation, passing the heated material continuously into an expansion and vaporization zone to volatilize said fatty acids, passing the volatilized acids upwardly through heat exchange zones of condensed fatty acids of increasing saturation and decreasing boiling temperature, passing said triglycerides downwardly through heat exchange zones against a countercurrent of steam, withdrawing saturated fatty acids from the uppermost of said zones, returning at least a portion of said saturated fatty acids to said uppermost zone as reflux liquid, withdrawing concentrated unsaturated fatty acid as liquid from a lower of said zones, and withdrawing said triglycerides from the last of said heat exchange zones.

20. The process of treating oleaginous material containing a mixture of volatile fatty acids having different boiling points and of saturated and unsaturated composition, which comprises subjecting said material to a continuous heating operation, passing the heated material continuously into an expansion zone to volatilize said fatty acids, passing the volatilized acids upwardly through heat exchange zones of condensed fatty acids of increasing saturation and decreasing boiling temperature, withdrawing saturated fatty acids from the uppermost of said zones, withdrawing concentrated unsaturated fatty acid as liquid from a lower of said zones, employing in said zones as reflux liquid a sufficient quantity of said saturated fatty acid to provide for a low content of unsaturated acids in said reflux and a low content of saturated acids in said withdrawn unsaturated fatty acid.

21. The process of treating oleaginous material containing a mixture of volatile fatty acids having different boiling points and of saturated and unsaturated composition, which comprises passing said material in a confined stream in heat exchange relation with a heating medium to raise the temperature of said material above that necessary to vaporize said fatty acids at reduced temperature, passing said material into an expansion and vaporization zone maintained at reduced pressure to volatilize said fatty acids, passing the volatilized acids upwardly through heat exchange zones of fatty acids of increasing saturation and decreasing boiling temperature, passing said triglycerides downwardly through heat exchange zones, passing steam upwardly countercurrent to said triglycerides and said fatty acids, withdrawing saturated fatty acid from the uppermost of said zones, withdrawing unsaturated fatty acid as liquid from a lower of said zones, employing in said zones as reflux liquid a sufficient quantity of said saturated fatty acid to provide a content of not more than substantially ten per cent saturated fatty acid in said withdrawn unsaturated acid.

22. A process for treating oleaginous material containing triglycerides and fatty acids of different boiling points, which comprises subjecting a relatively small stream of said material to an initial heating operation to raise the temperature above that necessary to volatilize said fatty acids at reduced pressure, introducing the heated material into an expansion and vaporization zone maintained at reduced pressure, passing the vaporized fatty acids upwardly through zones of decreasing boiling temperatures and against a countercurrent of reflux liquid, passing said triglycerides downwardly through lower zones against a countercurrent of steam, withdrawing triglycerides from said zones, mixing a portion of said triglycerides with the stream of material in said heating operation.

23. The process of treating a mixture of volatile fatty acids having different boiling points and of saturated and unsaturated composition, which comprises subjecting said mixture to a continuous heating operation, passing the heated material continuously into an expansion and vaporization zone, passing the vaporized fatty acids upwardly through heat exchange zones of condensed fatty acids of increasing saturation and decreasing boiling temperature, withdrawing a fraction rich in saturated fatty acid vapors from the uppermost of said zones, returning at least a portion of said saturated fatty acid fraction to said uppermost zone as reflux liquid, and withdrawing a fraction containing concentrated unsaturated fatty acids as liquid from a lower of said zones.

24. The process of treating a vaporous mixture of fatty acids having different boiling points and of saturated and unsaturated composition, which comprises passing the mixed vapors upwardly through heat exchange zones of condensed fatty acids of increasing saturation and decreasing boiling temperatures, withdrawing a vaporous fraction from the uppermost of said zones, returning at least a portion of said fraction to said zones as reflux liquid, and withdrawing a highly unsaturated liquid fraction from a lower of said zones.

25. The process as in claim 13 wherein the heating medium used has a vaporization temperature higher than the vaporization temperature of said fatty acids under the conditions of the process.

26. The process which comprises subjecting an incompletely hydrolyzed oil containing nonvolatile triglycerides and volatile fatty acids to a continuous heating operation to vaporize said fatty acids, separating the vaporized fatty acids from the undistilled triglycerides, subjecting the separated triglycerides to a further hydrolyzation procedure to produce an additional quantity of fatty acids and glycerine, separating the glycerine, vaporizing said additional fatty acids, and subjecting said vaporized additional fatty acids to a fractionation procedure to produce fatty acid fractions having different boiling points.

27. The process which comprises incompletely hydrolyzing a triglyceride to produce a mixture containing saturated fatty acids and unsaturated fatty acids of different boiling point and triglycerides, subjecting the mixture to continuous heating operation to vaporize said fatty acids, passing the vaporized fatty acids through heat exchange zones of condensed fatty acids of increasing saturation and decreasing boiling temperature, passing steam through said zones with said fatty acids, maintaining the quantity of said steam below one-half the quantity of said fatty acids, condensing vaporous saturated fatty acid from the upper of said zones, returning a sufficient quantity of the condensed saturated fatty acid to said zones as reflux liquid to provide in a lower of said zones a liquid fraction containing said unsaturated fatty acids in a concentration substantially greater than in said vaporized fatty acids, withdrawing said liquid product from a lower of said zones, heating said product, and returning the heated product to said zones for reboiling reflux liquid.

28. The process of treating fatty acid stock containing a mixture of fatty acids of different boiling points and of saturated and unsaturated nature, which comprises subjecting said fatty acids to a heating process to vaporize said fatty acids, subjecting the vaporous fatty acids to a fractionation procedure including the steps of passing the fatty acid vapors through zones of condensed fatty acid mixtures having successively lower boiling temperatures and increasing saturation, passing a minor quantity of steam through said zones with said vapors, condensing relatively low boiling highly saturated fatty acid vapor from one of said zones, returning a sufficient quantity of said highly saturated condensed fatty acid to said zones as reflux liquid to provide in another of said zones a liquid fraction containing an unsaturated fatty acid in a concentration substantially greater than in said mixture of fatty acids, and adding heat to said fatty acids in the fractionation procedure in addition to the heat supplied in said procedure by said fatty acids and said steam to reboil substantial quantities of said reflux liquid.

29. The process of treating fatty acid stock containing a mixture of fatty acids of different boiling points and of saturated and unsaturated nature, which comprises subjecting said fatty acids to a heating process to vaporize said fatty acids, subjecting said vaporous fatty acids to a fractionation procedure including the steps of passing the fatty acid vapors through zones of condensed fatty acid mixtures having successively lower boiling temperatures and increasing saturation, condensing relatively low boiling highly saturated fatty acid vapor from one of said zones, returning a sufficient quantity of said highly saturated condensed fatty acid to said zones as reflux liquid to provide in another of said zones a liquid fraction containing an unsaturated fatty acid in a concentration substantially greater than in said mixture of fatty acids, and adding heat to said fatty acids in the fractionation procedure in addition to the heat supplied said procedure by said fatty acids to reboil substantial quantities of said reflux liquid.

RALPH H. POTTS.
JOHN E. McKEE.